(12) United States Patent
Kikukawa et al.

(10) Patent No.: US 6,329,036 B1
(45) Date of Patent: Dec. 11, 2001

(54) OPTICAL RECORDING MEDIUM AND USE

(75) Inventors: Takashi Kikukawa; Hajime Utsunomiya, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/453,542

(22) Filed: Dec. 3, 1999

(30) Foreign Application Priority Data

Dec. 9, 1998 (JP) .................................................. 10-368537
Nov. 17, 1999 (JP) .................................................. 11-327519

(51) Int. Cl.⁷ ..................................................... B32B 3/02
(52) U.S. Cl. ...................... 428/64.1; 428/64.5; 428/64.6; 430/270.13
(58) Field of Search ................................ 428/64.1, 64.2, 428/64.4, 64.5, 64.6, 913; 430/270.13, 495.1, 945; 369/283, 288

(56) References Cited

U.S. PATENT DOCUMENTS 5,709,978 * 1/1998 Hirotsune ....................... 430/270.13
5,949,751 * 9/1999 Horikawa .......................... 369/275.2

FOREIGN PATENT DOCUMENTS

| 2-096926 | 4/1990 | (JP) . |
| 5-089511 | 4/1993 | (JP) . |
| 5-109117 | 4/1993 | (JP) . |
| 5-109119 | 4/1993 | (JP) . |
| 7-169094 | 7/1995 | (JP) . |

* cited by examiner

Primary Examiner—Elizabeth Evans
(74) Attorney, Agent, or Firm—Oblon, Spivak, McClelland, Maier & Neustadt, P.C.

(57) ABSTRACT

An optical recording medium has a mask layer of a non-linear optical material and a phase change recording layer, and an intermediate dielectric layer disposed therebetween wherein an optical aperture is formed in the mask layer upon exposure to a reading light beam. A recording light beam is irradiated to the recording layer from the side away from the mask layer, and a reading light beam is irradiated to the recording layer from the mask layer side. Microscopic recorded marks below the diffraction limit are readable.

16 Claims, 2 Drawing Sheets

RECORDING LIGHT BEAM

READING LIGHT BEAM

READING LIGHT BEAM

RECORDING LIGHT BEAM

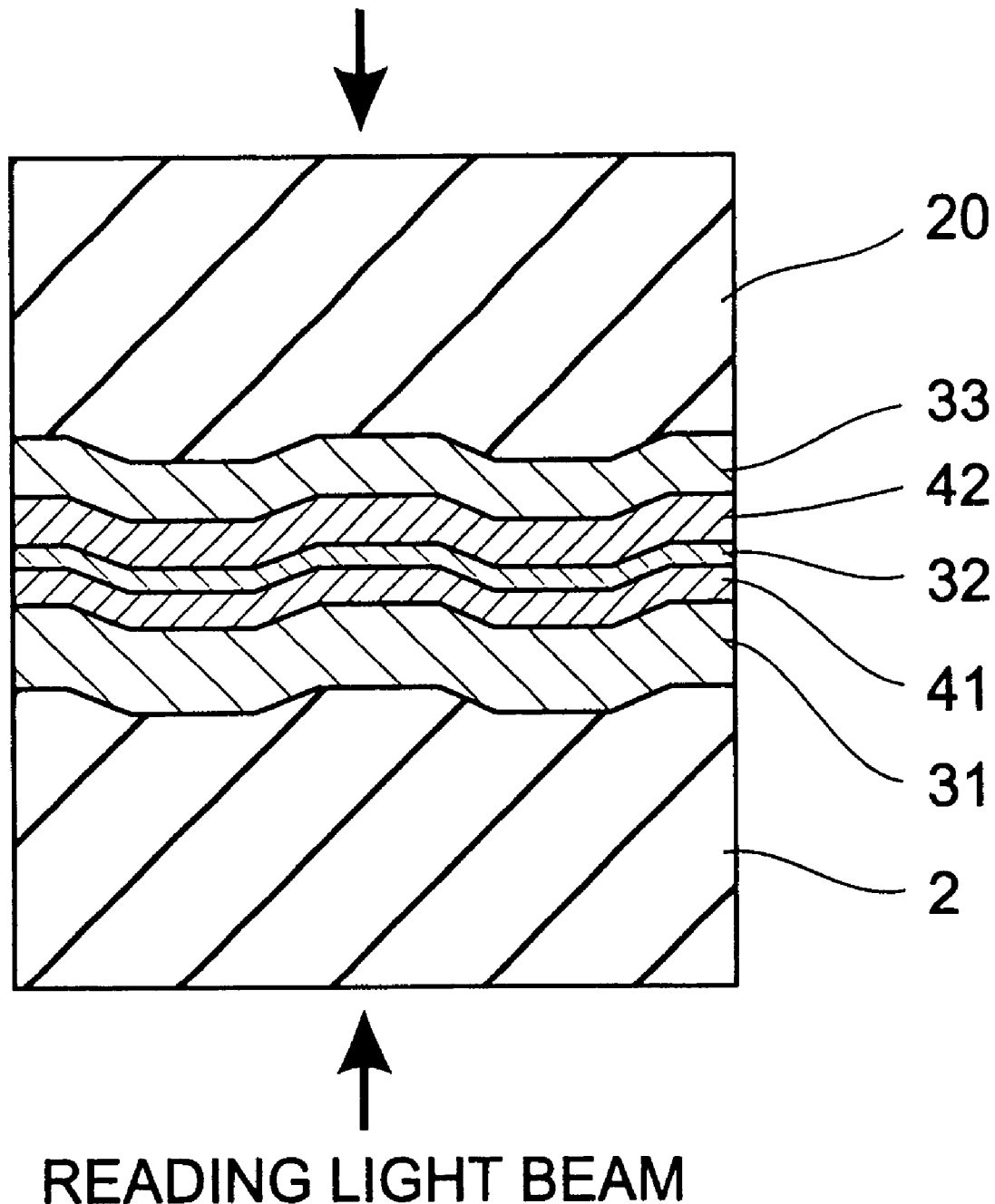

OPTICAL RECORDING MEDIUM AND USE

This invention relates to a method for using a phase change optical recording medium wherein microscopic recorded marks below the diffraction limit are readable, and an optical recording medium used therein.

BACKGROUND OF THE INVENTION

Recently, engineers are interested in optical recording media capable of high-density recording and of erasing and rewriting the recorded information. Such rewritable optical recording media include media of the phase change type wherein a laser beam is irradiated to a recording layer to change its crystallographic state to record a bit of information whereupon the information is read by detecting a change of reflectance of the recording layer due to the state change. The phase change optical recording media have the advantages that they can be overwritten by modulating the intensity of a single light beam and the drive requires a simpler optical system than that used for magneto-optical recording media.

In recording layers of the phase change type, chalcogenide materials such as Ge—Te and Ge—Sb—Te materials are often used because of a substantial difference of reflectance between crystalline and amorphous states and the relatively high stability of an amorphous state. Additionally, it was recently proposed to apply compounds known as chalcopyrite to the phase change recording layer. The chalcopyrite compounds have been widely studied as compound semiconductor material and applied to solar batteries and the like. The chalcopyrite compounds have a composition represented by Ib-IIIb-VIb2 or IIb-IVb-Vb2 according to the notation of the Periodic Table and are configured to have two stacked diamond structures. The structure of chalcopyrite compounds can be readily determined by x-ray structural analysis. Their fundamental characteristics are described in, for example, Monthly Physics, vol. 8, No. 8, 1987, p. 441 and Electrochemistry, vol. 56, No. 4, 1988, p. 228. Of these chalcopyrite compounds, it is known that $AgInTe_2$ can be used, after dilution with Sb or Bi, as the recording layer material in optical recording media adapted for operation at a linear velocity of about 7 m/s. JP-A 3-240590, 3-99884, 3-82593, 3-73384 and 4-151286 disclose phase change optical recording media using such chalcopyrite compounds. Besides, JP-A 4-267192, 4-232779 and 6-166268 disclose phase change optical recording media wherein an $AgSbTe_2$ phase is created as the recording layer crystallizes.

In general, information is recorded in phase change optical recording media by first conditioning the entire recording layer to be crystalline and irradiating a laser beam of a sufficient high power (recording power) to heat the recording layer at or above its melting point. At every spot where the recording power is applied, the recording layer is melted and then quenched, forming an amorphous recorded mark. The recorded mark can be erased by irradiating a laser beam of a relatively low power (erase power) so that the recording layer is heated to a temperature from its crystallization temperature to lower than its melting point. At the recorded mark where the erase power is applied, the material is heated at or above the crystallization temperature and then slowly cooled, resuming crystallinity. Consequently, the phase change optical recording medium can be overwritten by modulating the intensity of a single light beam.

As compared with magnetic recording media, phase change optical recording media and other optical recording media generally have a high recording density. The recent need to process a vast quantity of information as in images requires to further increase the recording density. The recording density per unit area can be increased by either narrowing the track pitch or reducing the space or blank between recorded marks to increase a linear recording density. However, if the track density or linear recording density is too high relative to the beam spot of reading light, the carrier-to-noise (C/N) ratio lowers, eventually to a level where signals are unreadable. The resolution upon signal readout is determined by the diameter of a beam spot. More illustratively, provided that the reading light has a wavelength $\lambda$ and the optical system of the reading equipment has a numerical aperture NA, the readout limit is generally given by a spatial frequency $2NA/\lambda$. Accordingly, reducing the wavelength of reading light and increasing the NA are effective means for improving the C/N and resolution upon readout. A number of technical studies that have been made thus far reveal that many technical problems must be solved before such effective means can be introduced.

Under the circumstances, JP-A 2-96926 discloses a recording carrier having a layer of non-linear optical material capable of ultrahigh resolution. The non-linear optical material is a material whose optical characteristics vary with incident radiation. Such changes include changes of transmittance, reflectance and refractive index as well as a change of the shape of the layer. By irradiating a reading light beam to the information-bearing surface through the non-linear optical material layer, smaller areas of the object can be read out.

The above patent discloses a breaching layer as the non-linear optical material layer. The breaching layer increases transmittance as the intensity of incident radiation increases. Gallium arsenide, indium arsenide and indium antimony are exemplified as the material used in the breaching layer. The layer of such non-linear optical material requires for reading light to have a high energy density since all absorption centers must be excited.

JP-A 5-89511, 5-109117, and 5-109119 disclose optical disks comprising a substrate having optically readable phase pits formed therein and a layer of a material that changes its reflectance with temperature. The reflectance changing material layer, through approximately the same action as the non-linear material layer in the above-referred JP-A 2-96926, is effective in achieving a high resolution beyond the readout limit governed by the wavelength $\lambda$ of reading light and the numerical aperture NA of an objective lens. The material layer requires for reading light to have a high power since a change from crystal to liquid or from amorphous to liquid is necessary upon readout.

JP-A 7-169094 discloses an optical recording medium comprising a phase change recording layer, a mask layer, and an intermediate dielectric layer disposed therebetween. The mask layer has substantially the same function as the non-linear material layer in JP-A 2-96926 and is formed of a phase-changeable material. In this optical recording medium, upon readout, the mask layer is melted to reduce the imaginary part of its complex index of refraction to the range of 0.25 to 1.0 so that microscopic recorded marks can be read out through the molten portions of the mask layer.

It was recently proposed to improve the readout limit by constructing a structure analogous to the ultrahigh resolution medium described in JP-A 2-96926 and placing the non-linear optical material layer and the recording layer more closely so that near field light may be utilized, as reported in Appl. Phys. Lett., Vol. 73, No. 15, pp. 2078–2080, 1998. In this report, the non-linear optical material layer is formed of Sb, the recording layer is formed of $Ge_2Sb_2Te_5$, and an SiN layer of 20 nm thick is sandwiched between the non-linear optical material layer and the recording layer. The report states that recorded marks of less than 100 nm can be read out. It is noted that in Example of JP-A 7-169094, the distance between the non-linear optical material layer (specifically the mask layer) and the recording layer, which corresponds to the thickness of the intermediate dielectric layer, is set at 180 nm, which is significantly greater than the distance between the non-linear optical material layer and the recording layer in Appl. Phys. Lett., Vol. 73, No. 15, pp. 2078–2080, 1998.

In the report of Appl. Phys. Lett., Vol. 73, No. 15, pp. 2078–2080, 1998, a laser beam is irradiated to the recording layer through the non-linear optical material layer to form recorded marks. A laser beam defines a spot having an intensity distribution approximate to the Gaussian distribution wherein the intensity decreases from near the center toward the periphery. Then in conventional phase change optical recording media, by using a recording light beam of approximate power, only the area closely surrounding the center of the beam spot can be heated to a temperature necessary for recording. A recorded mark which is smaller than the beam spot diameter can be formed in this way. However, we found that when a recording light beam is irradiated to the recording layer through the non-linear optical material layer, the area of the recording layer to which the laser beam is irradiated has an energy distribution largely departing from the Gaussian distribution, which renders it difficult to form microscopic recorded marks by utilizing only the area closely surrounding the center of the beam spot.

It is also presumed that in Appl. Phys. Lett., Vol. 73, No. 15, pp. 2078–2080, 1998, crystalline recorded marks are formed in the amorphous recording layer. With this method of forming crystalline recorded marks, it is substantially impossible to perform overwriting by modulating the intensity of a laser beam between the write power level and the erase power level. To enable overwriting, the medium must be constructed such that the recording layer is previously initialized or crystallized, and amorphous recorded marks are formed therein.

However, the formation of amorphous recorded marks requires a greater power than the formation of crystalline recorded marks since amorphous recorded marks are formed by once melting the recording layer. When a recording light beam of such high power is irradiated through the non-linear optical material layer, the non-linear optical material layer can be degraded. Also, if a recording light beam of high power is irradiated from the non-linear optical material layer side, there arises the problem that recorded marks located proximate the beam spot (that is, recorded marks pre-formed on a track in a medium and recorded marks on adjacent tracks) can be erased.

For initialization, a laser beam must be irradiated over the entire surface of the recording layer by means of a bulk eraser. If the laser beam is irradiated from the non-linear optical material layer side, the non-linear optical material layer is undesirably heated and thus deteriorated. Another problem is that the power required for initialization becomes greater than in conventional phase change optical recording media.

We actually prepared a medium and tested it for write/read operation in accordance with Appl. Phys. Lett., Vol. 73, No. 15, pp. 2078–2080, 1998. It was confirmed that recorded marks could be read out. However, as signal readout was repeated, the C/N ratio drastically dropped, rendering the readout impossible within a short time. The medium was found to have poor durability against readout. What we learned as the reason is that the recorded marks substantially erased within a short time since a reading light beam with relatively high energy was applied in order to induce an optical change in the non-linear optical material layer.

SUMMARY OF THE INVENTION

The invention relates to the use of an optical recording medium comprising a lamination of a non-linear optical material layer and a phase change recording layer wherein microscopic recorded marks below the diffraction limit can be read out. An object of the invention is to enable microscopic recorded marks below the diffraction limit to be formed in a stable manner.

Another object of the invention is, on use of the optical recording medium, to enable overwriting, preclude deterioration of the non-linear optical material layer, and prevent recorded marks located proximate the beam spot from being erased during recording.

A further object is, on use of the optical recording medium, to enable stable readout.

The invention pertains to an optical recording medium comprising a mask layer, a phase change recording layer, and an intermediate dielectric layer disposed therebetween, wherein an optical aperture is formed in the mask layer upon exposure to a reading light beam.

In a first aspect, the invention provides a method for using the optical recording medium, comprising the steps of irradiating a recording light beam to the recording layer from the side away from the mask layer and irradiating a reading light beam to the recording layer from the mask layer side. In a second aspect, the method involves the step of crystallizing the recording layer for initialization prior to recording. The crystallizing step is by irradiating light to the recording layer from the side away from the mask layer, for heating the recording layer.

In a third aspect, the invention provides an optical recording medium to be used by the method, comprising a lamination comprising a mask layer, a phase change recording layer, and an intermediate dielectric layer disposed therebetween, and a pair of substrates between which the lamination intervenes. In one preferred embodiment, the substrate located on the side where the recording light beam is incident is equal in thickness to the substrate located on the side where the reading light beam is incident, or the former is thinner than the latter. Preferably the recording layer contains silver, indium, antimony and tellurium as main components, and more preferably germanium or nitrogen or both as additional components. The intermediate dielectric layer preferably has a thickness of 5 to 70 nm. Typically, near field light created proximate the optical aperture is utilized for reading.

FUNCTION AND RESULTS

Referring to FIG. 1, there is illustrated one exemplary construction of the optical recording medium of the invention. The optical recording medium has a mask layer 41 and a phase change recording layer 42 which are separated by an intermediate dielectric layer 32. The mask layer 41 has the same function as the non-linear optical material layer described previously. A recording light beam is irradiated to the recording layer 42 from the side remote from the mask layer 41 or the recording layer 42 side, and a reading light beam is irradiated to the recording layer 42 from the mask layer 41 side.

The invention solves the previously described problems since the recording light beam is irradiated to the recording layer 42 without passing the mask layer 41. More particularly, the beam spot defined on the recording layer has an intensity distribution approximately equal to the Gaussian distribution, enabling stable formation of a recorded mark sized smaller than the beam spot diameter. Even when a recording light beam of high power necessary to form an amorphous recorded mark is irradiated, the mask layer 41 is deteriorated to a less extent. Since the mask layer does not absorb the power of the recording light beam, the recording power may be reduced. The phenomenon that recorded marks located proximate the beam spot are erased is substantially precluded.

When the laser beam used for the purpose of initialization is irradiated to the recording layer 42 from the side away from the mask layer 41 as is the recording light beam, the mask layer is prevented from deterioration and the power of laser beam necessary for initialization can be reduced.

The operation associated with reading light is described. The reading light beam to be irradiated to the optical recording medium is focused at or near the mask layer 41. Within the plane of the mask layer 41, the reading light beam defines a spot having an intensity distribution approximate to the Gaussian distribution. That is, the spot of the reading light beam has an intensity distribution wherein the intensity decreases from near the center toward the periphery. Then, by using a reading light beam of appropriate power, only the area of the mask layer 41 closely surrounding the center of the beam spot can be heated to a temperature necessary to form an optical aperture. By irradiating such a reading light beam, an optical aperture sized smaller than the beam spot diameter is formed, which enables super resolution reading.

In an optical recording medium wherein the mask layer is very close to the recording layer as in the medium described in Appl. Phys. Lett., Vol. 73, No. 15, pp. 2078–2080, 1998, the recording layer experiences a substantial temperature rise when an optical aperture is formed in the mask layer. Then the recorded marks on the recording layer can be readily erased upon reading. As a result, the medium having closely disposed layers is less durable against reading and turns to be unreadable within a short time.

In order to improve durability against reading, the recording layer 42 is preferably formed of a recording material containing Ag, In, Sb and Te as main components, to be referred to as Ag—In—Sb—Te base recording material, hereinafter. As compared with the Ge—Sb—Te base recording material described in Appl. Phys. Lett., Vol. 73, No. 15, pp. 2078–2080, 1998, this phase change recording material has a high crystallization temperature and is satisfactorily durable against reading. When Ge and/or N is added to the Ag—In—Sb—Te base recording material as an additional component, the material has a higher crystallization temperature, becomes more durable against reading and is prevented from a decline of reliability during high-temperature storage. The addition of Ge to the recording layer is especially preferable since Ge causes no substantial drop of the reflectance thereof.

As used herein, the term "medium wherein the mask layer is very close to the recording layer" encompasses optical recording media utilizing near field light as described above and optical recording media in which the distance between the mask layer and the recording layer (that is, the thickness of the intermediate dielectric layer) is as short as 5 to 70 nm, especially 10 to 50 nm, even where the generation of near field light is not ascertainable.

BRIEF DESCRIPTION OF THE DRAWINGS

FIG. 3 is a schematic cross-sectional view of an optical recording medium according to a further embodiment of the invention.

DESCRIPTION OF THE PREFERRED EMBODIMENTS

Figure 1:
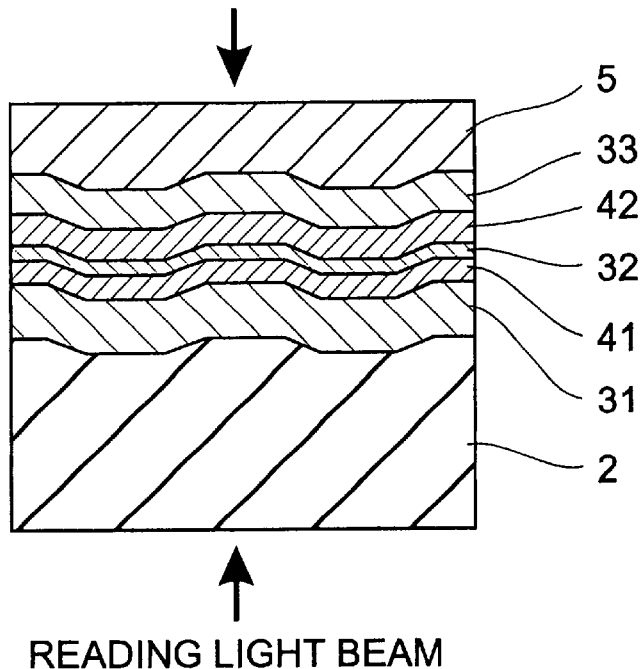
FIG. 1 is a schematic cross-sectional view of an optical recording medium according to one embodiment of the invention.

FIG. 1 illustrates one exemplary construction of the optical recording medium of the invention. The medium has a lower dielectric layer 31, a mask layer 41, an intermediate dielectric layer 32, a recording layer 42, an upper dielectric layer 33, and a protective layer 5 successively stacked on a substrate 2 in the described order.

Substrate 2

In the construction illustrated in FIG. 1, a reading light beam is irradiated to the recording layer 43 through the substrate 2. The substrate 2 is then constructed of materials which are substantially transparent to the light beam used, for example, resins and glass. Of these, resins are preferable because of ease of handling and low cost. Exemplary resins include acrylic resins, polycarbonate resins, epoxy resins, and polyolefin resins. The shape and size of the substrate are not critical although the substrate is most often of disk shape. Typically the substrate disk has a thickness of about 0.1 to 3 mm and a diameter of about 50 to 360 mm. If necessary, the substrate on the surface is provided with grooves in a predetermined pattern for the tracking and addressing purposes.

Figure 2:
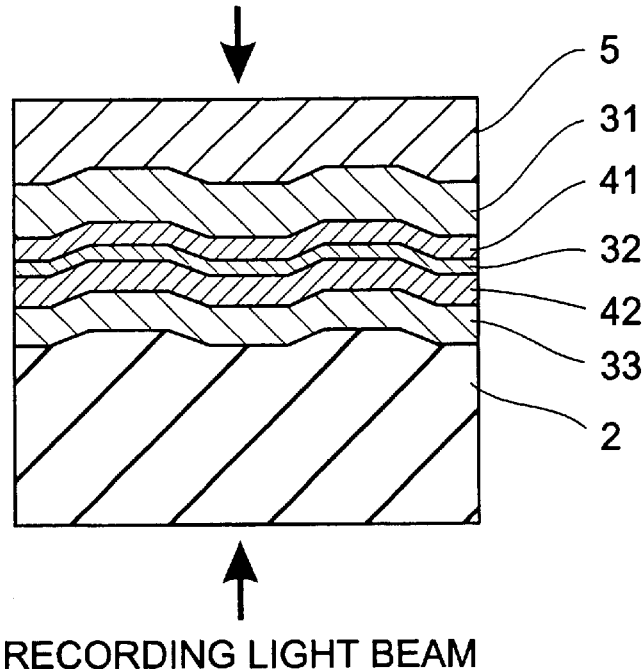
FIG. 2 is a schematic cross-sectional view of an optical recording medium according to another embodiment of the invention.

Another construction is illustrated in FIG. 2 wherein a reading light beam is irradiated to the recording layer without passing the substrate. The medium has a recording layer 42, an intermediate dielectric layer 32, and a mask layer 41 stacked on a substrate 2 in the described order. The stacking order of all layers including other dielectric layers is reversed from the construction of FIG. 1.

A further construction is illustrated in FIG. 3 wherein a lower dielectric layer 31, a mask layer 41, an intermediate dielectric layer 32, a recording layer 42, and an upper dielectric layer 33 are sandwiched between a pair of substrates 2 and 20. In this embodiment, both the substrates are preferably formed of the same material to the same thickness. The reason is given below. Where a laser beam is irradiated to the optical recording medium through a transparent substrate whereby an aberration is introduced due to passage through the substrate, the optical pickup is generally designed such that the objective lens imparts a reverse aberration to the laser beam in order to correct for the aberration. In the constructions shown in FIGS. 1 and 2, only one of the reading and recording light beams enters the medium through the substrate 2. If a common optical pickup is used for both recording and reading operations, it is impossible to impart optimum aberration corrections to both the recording and reading light beams. If identical substrates are located on both the reading light beam incident side and the recording light beam incident side as shown in FIG. 3, then a single optical pickup ensures optimum recording and reading operations.

The provision of substrates on opposite sides of the medium is also effective for minimizing the influence of dust and debris which will deposit on the medium surface. In the medium of the structure shown in FIG. 1 or 2 wherein the protective layer 5 is constructed by a resin layer as commonly employed in compact disks, which is as thin as about 10 µm, the light beam must have been focused to a relatively small diameter when it reaches the surface of the protective layer 5. Thus, if foreign particles deposit on the surface of the protective layer 5, the foreign particle blocks at least a portion of the light beam, exerting a substantial influence on recording or reading operation. By contrast, when a substrate which is as thick as about 0.1 mm or greater is provided instead of the protective layer, any foreign particle on the surface thereof has little influence on recording or reading operation because the diameter of the light beam is still relatively large at the position of the foreign particle.

In the structure shown in FIG. 3, the substrates 2 and 20 can be different in thickness. The substrate 20 is preferably thinner than the substrate 2 for the following reason. The use of a thin substrate leads to a wider tilt margin. The tilt margin represents the allowance of tilt of the medium relative to the optical system and is determined by the numerical aperture (NA) of an optical pickup. The tilt margin is proportional to:

$$\lambda/(t \cdot NA^3)$$

wherein λ is the wavelength of writing and reading light, and t is the thickness of a transparent substrate where writing and reading light enters. If the medium is inclined relative to the laser beam to induce a tilt, there occurs wave front aberration or comatic aberration. The coefficient of wave front aberration is represented by:

$$(\tfrac{1}{2}) \cdot t \cdot \{n^2 \cdot \sin\theta \cdot \cos\theta\} \cdot NA^3/(n^2 - \sin^2\theta)^{5/2}$$

wherein n is the refractive index of the substrate and θ is the angle of inclination. It is seen from these expressions that when an optical pickup having a high NA is used, the effective means for increasing the tilt margin and controlling the occurrence of comatic aberration is to reduce the thickness t of the substrate. That is, a thinner substrate allows for use of an optical pickup having a high NA, which in turn, permits a light beam to be reduced in spot diameter at the focus plane. Since the recording light beam does not pass the mask layer 41 according to the invention, it is preferred for high density recording to minimize the spot diameter of recording light beam. On the other hand, since super-resolution reading is carried out using the mask layer according to the invention, it is not requisite that the optical pickup for reading have a greater NA. Also, if one substrate is thin, then the other substrate must be thick in order to impart rigidity to the medium. For the above reason, where the substrates in FIG. 3 are different in thickness, it is preferred that the substrate 20 be thinner than the substrate 2.

It is noted that where one substrate in the structure shown in FIG. 3 is as thin as about 0.1 to 0.3 mm, it may be formed by attaching a resin film or by applying a curable resin followed by curing. In the embodiment wherein both the substrates are relatively thick, one preferred procedure is to form the mask layer, recording layer, and dielectric layers on one substrate, then form a resinous protective layer similar to the protective layer 5 in FIGS. 1 and 2, and stacking the other substrate on the resinous protective layer with an adhesive layer interleaved therebetween.

Lower dielectric layer 31

The lower dielectric layer 31 is provided if necessary for preventing the substrate 2 from thermal deformation and for controlling the optical characteristics (e.g., reflectance) and heat transfer of the entire medium. Since the mask layer 41 is heated to a high temperature during recording, reading and erasing operations, the substrate 2 formed of a less heat resistant resin can be thermally deformed. The lower dielectric layer 31 prevents the substrate 2 from such thermal deformation. The lower dielectric layer 31 also functions to control the rate at which the mask layer 41 is cooled.

The material of which the lower dielectric layer 31 is made may be selected as appropriate from various dielectric materials. Useful dielectric materials include silicon nitride such as $Si_3N_4$, silicon oxide such as $SiO_2$, mixtures of zinc sulfide and silicon oxide, compositions containing La, Si, O and N, known as LaSiON, compositions containing Si, Al, O and N, known as SiAlON, yttrium-containing SiAlON, and NdSiON.

The thickness of the lower dielectric layer 31 is not critical. The thickness may be determined as appropriate to restrain the substrate 2 from thermal deformation. A typical thickness is from about 50 to 300 nm.

The lower dielectric layer 31 is preferably formed by vapor deposition such as sputtering or evaporation.

Mask Layer 41

The mask layer 41 is constructed of a mask material allowing an optical aperture to be formed therein. The mask material used herein may be selected from, for example, the non-linear optical materials described in JP-A 2-96926 and the mask materials described in JP-A 7-169094. Beside these materials, any desired material can be used, without particular limitation, as long as an optical aperture can be formed therein. By the term "optical aperture" used herein is meant the region of mask material where the transmittance of incident light has increased due to changes of optical characteristics including transmittance, reflectance and refractive index, shape changes, and volume changes.

The invention is advantageous especially when the formation of an optical aperture in the mask layer 41 has a substantial thermal influence on the recording layer 42. Better results are then obtained when using a mask material which is heated to a relatively high temperature when an optical aperture is formed, and typically a mask material which is melted during reading.

Useful mask materials used herein are metals or alloys containing as a main component at least one element selected from among Sb, Ge, Ga, Te, Sn, In, Se, Si, Ag, and Zn, preferably metals or alloys containing at least Sb, and most preferably Sb.

The mask layer 41 preferably has a thickness of 10 to 25 nm. Too thin a mask layer may have an insufficient masking function because the region of the layer other than the optical aperture may have a too high light transmittance. Too thick a mask layer may lead to a decline of reading durability because a greater power is necessary to form the optical aperture.

The method for forming the mask layer 41 is not critical, and a choice may be made among sputtering and evaporating methods.

Intermediate Dielectric Layer 32

The intermediate dielectric layer 32 is provided in order to separate the mask layer 41 from the recording layer 42. The material of the intermediate dielectric layer 32 is not critical and may be selected as appropriate from the dielectric materials exemplified for the lower dielectric layer 31. Since the intermediate dielectric layer is sandwiched between the mask layer and the recording layer which are repeatedly subject to melting and crystallization, it is recommended to use dielectric materials which are more resistant to thermal impact, for example, silicon nitride, mixtures of zinc sulfide and silicon oxide, LaSiON, and AlN—ZnS—$SiO_2$.

The thickness of the intermediate dielectric layer 32 may be determined as appropriate to enable reading of high-density recorded information. An appropriate thickness is from about 5 to about 70 nm, more preferably from about 10 to about 50 nm. Too thin an intermediate dielectric layer may fail to endure thermal impact during recording and reading operations. Too thick an intermediate dielectric layer may disturb the reading of high-density recorded information.

The intermediate dielectric layer 32 is preferably formed by vapor deposition such as sputtering or evaporation.

Recording layer 42

The recording layer 42 contains silver (Ag), indium (In), antimony (Sb) and tellurium (Te) as main components and preferably, germanium (Ge) or nitrogen (N) or both as additional components. The atomic ratio of the main component elements is represented by the formula (I):

$$Ag_a In_b Sb_c Te_d$$

wherein the letters a, b, c and d are preferably in the range:

$a=0.02$ to $0.20$, $b=0.02$ to $0.20$, $c=0.35$ to $0.80$, and $d=0.08$ to $0.40$, and more preferably in the range:

$a=0.02$ to $0.10$, $b=0.02$ to $0.10$, $c=0.50$ to $0.75$, and $d=0.10$ to $0.35$.

In formula (I), too smaller values of a would render difficult the re-crystallization of recorded marks and hence, repetitive overwriting. With too larger values of a, excessive Ag would singly diffuse into the Sb phase during recording and erasing operations, adversely affecting rewriting durability and reducing both the stability of recorded marks and the stability of crystalline areas. This results in a loss of reliability. More particularly, the storage of the medium at high temperature promotes the crystallization of recorded marks, deteriorating C/N and modulation. Additionally, repeated recording operations tend to promote the deterioration of C/N and modulation.

With too smaller values of b in formula (I), recorded marks would become insufficiently amorphous, resulting in reduced modulation and reliability. With too large values of b, the areas other than recorded marks would have a lower reflectance, resulting in reduced modulation.

With too smaller values of c in formula (I), the reflectance difference associated with a phase change becomes greater, but there is a possibility that the crystal transition rate drastically slows down, preventing erasure. With too large values of c, the reflectance difference associated with a phase change becomes smaller, resulting in reduced modulation.

With too smaller values of d in formula (I), there is a possibility that it is difficult to make the recording layer amorphous and no signals are recorded. With too large values of d, the crystal transition rate would become too low, preventing erasure.

The content of Ge in the recording layer is preferably up to 25 at %, more preferably up to 15 at %. With too higher contents of Ge, the Ag—In—Sb—Te recording material would exert its desired characteristics to a less extent. In order that Ge added exert its effect of improving reading durability to a full extent, the Ge content should preferably be at least 1 at %, more preferably at least 2 at %.

In order that nitrogen be contained in the recording layer, the recording layer may be formed, for example, by effecting sputtering in an atmosphere containing nitrogen gas in addition to a rare gas such as argon. The flow rate ratio of nitrogen gas to rare gas in the atmosphere may be set such that the nitrogen addition effect may be fully exerted and the nitrogen content may not become excessive, and typically in the range from 2/150 to 8/150. If the flow rate ratio is too low, the nitrogen content in the recording layer becomes too low, so that the nitrogen addition effect may not be fully exerted. If the flow rate ratio is too high, the nitrogen content in the recording layer becomes too high, so that the reflectance difference of the recording layer associated with a phase change may become smaller, resulting in reduced modulation.

In addition to the above-described main and additional components, the recording layer may contain other elements if desired. Such an additional element is an element M which is selected from among H, Si, C, V, W, Ta, Zn, Ti, Ce, Tb, Sn, Pb, and Y and mixtures thereof. Element M has the function of enhancing rewriting durability, more particularly suppressing the lowering of percent erasure by repetitive rewriting and the additional function of improving the reliability under rigorous conditions including high temperature and high humidity. Of the above-exemplified elements M, at least one of V, Ta, Ce, and Y is preferred. The content of element M in the recording layer is preferably up to 10 at %. If the content of element M is too high, the reflectance difference of the recording layer associated with a phase change may become smaller, resulting in reduced modulation.

It is preferable that the recording layer consist essentially of the above-described elements although it is acceptable that Ag is partially replaced by Au, Sb is partially replaced by Bi, Te is partially replaced by Se, and In is partially replaced by Al and/or P. The percent replacement of Ag by Au should preferably be up to 50 at %, more preferably up to 20 at %. With a too higher replacement of Ag by Au, recorded marks would become likely to crystallize, exacerbating the reliability at high temperature. The percent replacement of Sb by Bi should preferably be up to 50 at %, more preferably up to 20 at %. With a too higher replacement of Sb by Bi, the recording layer would have an increased coefficient of absorption and hence, a reduced optical interference effect, by which the reflectance difference between crystalline and amorphous areas is reduced, leading to reduced modulation and C/N. The percent replacement of Te by Se should preferably be up to 50 at %, more preferably up to 20 at %. With a too higher replacement of Te by Se, the crystal transition rate would become too slow, failing to achieve a sufficient percent erasure. The percent replacement of In by Al and/or P should preferably be up to 40 at %, more preferably up to 20 at %. With a too higher replacement of In by Al and/or P, recorded marks would become less stable, resulting in reduced reliability. The ratio of Al to P is arbitrary.

The recording layer preferably has a thickness of about 9.5 to 50 nm, more preferably about 13 to 30 nm. If the recording layer is too thin, the growth of crystalline phase is restrained, resulting in an insufficient reflectance change associated with a phase change. If the recording layer is too thick, a substantial amount of Ag diffuses into the recording layer in a thickness direction during formation of recorded marks, and the proportion of Ag diffusing in the in-plane direction of the recording layer is reduced. As a result, the recording layer becomes less reliable. The too thick recording layer would also lead to reduced reflectance and modulation.

The composition of the recording layer may be analyzed by EPMA, x-ray micro-analysis or ICP.

Preferably the recording layer is formed by sputtering. The sputtering conditions are not critical. When a material containing a plurality of elements is to be sputtered, for example, either an alloy target or a multi-source sputtering technique of using a plurality of targets may be used.

Upper Dielectric Layer 33

The upper dielectric layer 33 is provided if necessary for controlling the cooling rate of the recording layer 42. The material of the upper dielectric layer 33 is not critical and may be selected as appropriate from the same dielectric materials as exemplified for the intermediate dielectric layer 32. Dielectric materials having a relatively high heat conductivity are preferred for enhancing the cooling effect. Also, since the upper dielectric layer 33 is repeatedly subject to thermal impact, those materials which are resistant to deformation and failure by thermal impact are preferable. Such useful dielectric materials are silicon nitride, mixtures of zinc sulfide and silicon oxide, and $AlN—ZnS—SiO_2$.

The upper dielectric layer 33 preferably has a thickness of about 8 to about 30 nm, more preferably about 15 to about 25 nm. A too thin layer would fail by thermal impact. If the upper dielectric layer is too thick, the cooling rate of the recording layer 42 would become too slow to form satisfactory recorded marks, leading to low C/N.

Depending on the material and thickness of the upper dielectric layer 33, the reflectance of a recording light beam entering from the upper dielectric layer 33 side can be altered. By constructing the upper dielectric layer 33 so as to reduce the reflectance, the recording sensitivity is improved.

The upper dielectric layer 33 is preferably formed by vapor deposition such as sputtering or evaporation.

Protective Layer 5

The protective layer 5 is provided if necessary for improving scratch resistance and corrosion resistance. The protective layer 5 is generally constructed of various organic materials. Preferred are radiation-curable compounds and compositions thereof, which are cured with radiation such as electron beams or UV radiation. The protective layer 5 preferably has a thickness of about 0.1 to about 100 $\mu$m. The protective layer 5 may be formed by conventional methods such as spin coating, gravure coating, spray coating, and dipping.

Recording and Reading

The invention is applicable to either an optical recording medium of the type (to be referred to as first type, hereinafter) wherein recorded marks are formed by changing crystalline unrecorded areas into an amorphous or microcrystalline state or another optical recording medium of the type (to be referred to as second type, hereinafter) wherein recorded marks are formed by changing amorphous or microcrystalline unrecorded areas into a crystalline state.

First described are recording, reading and erasing operations associated with the first type. As previously described, the invention is advantageously applicable to the first type capable of overwriting.

Since the recording layer 42 as deposited generally remains amorphous, it is crystallized by applying a DC laser beam thereto to heat it, followed by cooling. This crystallization is generally known as initialization. A general practice for initialization is to crystallize the recording layer in a solid phase without melting it although it is acceptable that the recording layer is once melted. The laser beam for initialization may be irradiated to the recording layer 42 from the mask layer 41 side, but preferably from the side away from the mask layer 41, that is, without passing the mask layer 41. By irradiating the laser beam to the recording layer 42 from the side away from the mask layer 41, the thermal damage to the mask layer 41 can be minimized and the power required for initialization be reduced. If the mask layer 41 as deposited remains amorphous and must be crystallized in order for the layer to serve as the mask layer, the mask layer 41 can be crystallized at the same time as is the recording layer 42.

On recording, a recording light beam is irradiated to the recording layer 42 from the side away from the mask layer 41, that is, without passing the mask layer 41. Since the laser beam defines on the irradiated surface a spot having an intensity distribution, a recorded mark of a desired size smaller than the beam spot diameter can be formed using a recording light beam of an appropriate power.

On reading, a laser beam of a power sufficient to form an optical aperture in the mask layer 41, but not sufficient to erase the recorded marks in the recording layer 42 is irradiated to the recording layer 42 from the mask layer 41 side. An optical aperture of a desired size smaller than the beam spot diameter is formed in the mask layer 41 by way of a mechanism similar to that described for the formation of microscopic recorded marks. This enables reading far below the diffraction limit. Immediately after the beam spot passes over, the optical aperture in the mask layer is closed again, restraining crosstalk between adjacent recorded marks.

Understandably, the medium of the invention may be constructed such that the reading light beam is reflected by the recording layer 42 and transmitted again by the optical aperture in the mask layer 41 before it emerges from the medium. Alternatively, the medium is constructed such that the reading light beam is transmitted by the recording layer 42 before it emerges from the medium. In the former case, the optical detector for detecting the reading light beam can be integrated with the reading light beam emitter, enabling a reading unit of simpler structure and eliminating a need for alignment between a light emitter and a light detector.

On erasing, a laser beam of a power sufficient to erase the recorded marks in the recording layer 42 is irradiated to the recording layer 42. An ordinary and preferred practice is to perform overwriting by modulating the intensity of a laser beam at least between the recording power level and the erase power level.

Next, the second type wherein the recorded marks are crystalline is described. In the second type, by irradiating a recording light beam to the amorphous or microcrystalline recording layer 42, crystalline recorded marks are formed. On reading, the recorded marks are read out in the same manner as in the first type. On erasing, the crystalline recorded marks must be changed into an amorphous or microcrystalline state. A high power laser beam must then be irradiated for erasure. Consequently, those recorded marks located proximate the beam spot can also be erased. For this reason, the second type is substantially used as a write-once read many type optical recording medium. The second type is difficult to rewrite, but eliminates a need for initialization of the recording layer.

Specific values of the recording, reading and erasing powers can be empirically determined within the skill of the ordinary artisan.

Japanese Patent Application No. 10-368537 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A method for using an optical recording medium comprising a mask layer, a phase change recording layer, and an intermediate dielectric layer disposed therebetween, wherein an optical aperture is formed in the mask layer upon exposure to a reading light beam, said method comprising the steps of:

irradiating a recording light beam to the recording layer from the side away from the mask layer and irradiating a reading light beam to the recording layer from the mask layer side.

2. A method for using an optical recording medium comprising a mask layer, a phase change recording layer, and an intermediate dielectric layer disposed therebetween, wherein an optical aperture is formed in the mask layer upon exposure to a reading light beam, said method comprising the step of crystallizing the recording layer for initialization prior to recording, said step including irradiating light to the recording layer from the side away from the mask layer, for heating the recording layer.

3. An optical recording medium to be used by the method of claim 1 or 2, comprising a lamination comprising a mask layer, a phase change recording layer, and an intermediate dielectric layer disposed therebetween, and a pair of substrates between which the lamination intervenes.

4. The optical recording medium of claim 3 wherein the substrates are substantially equal in thickness.

5. The optical recording medium of claim 3 wherein the substrate located on the side where the recording light beam is incident is thinner than the substrate located on the side where the reading light beam is incident.

6. The optical recording medium of claim 3 wherein said recording layer contains silver, indium, antimony and tellurium as main components.

7. The optical recording medium of claim 3 wherein said recording layer contains germanium or nitrogen or both as additional components.

8. The optical recording medium of claim 3 wherein said intermediate dielectric layer has a thickness of 5 to 70 nm.

9. The optical recording medium of claim 3 wherein near field light created proximate the optical aperture is utilized for reading.

10. The optical recording medium of claim 3, wherein the intermediate dielectric layer has a thickness of 10 to 50 nm.

11. The optical recording medium of claim 3, wherein the substrates comprise resin or glass.

12. The optical recording medium of claim 3, wherein the resins are selected from the group consisting of acrylic resin, polycarbonate resin, epoxy resin, and polyolefin resin.

13. The optical recording medium of claim 3, wherein the substrates have a thickness of 0.1 to 3 mm.

14. The optical recording medium of claim 3, wherein the dielectric layer is selected from the group consisting of silicon nitride, silicon oxide, mixtures of zinc sulfide and silicon oxide, LaSiON compositions, SiAlON compositions, yttrium-containing SiAlON compositions, and NdSiON.

15. The optical recording medium of claim 3, wherein the recording layer has a thickness of 9.5 to 50 nm.

16. The optical recording medium of claim 3, further comprising a lower dielectric layer disposed between a substrate and the mask layer and/or an upper dielectric layer disposed between a substrate and the recording layer.

* * * * *